(12) United States Patent
Heuer

(10) Patent No.: US 11,565,795 B2
(45) Date of Patent: *Jan. 31, 2023

(54) VERTICAL TAIL UNIT FOR FLOW CONTROL

(71) Applicant: AIRBUS OPERATIONS GMBH, Hamburg (DE)

(72) Inventor: Thomas Heuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 127 days.

This patent is subject to a terminal disclaimer.

(21) Appl. No.: 17/213,027

(22) Filed: Mar. 25, 2021

(65) Prior Publication Data

US 2021/0214072 A1   Jul. 15, 2021

Related U.S. Application Data

(63) Continuation of application No. 16/153,993, filed on Oct. 8, 2018, now Pat. No. 10,974,817.

(30) Foreign Application Priority Data

Oct. 9, 2017   (DE) ............... 10 2017 123 440.3

(51) Int. Cl.
*B64C 21/08*   (2006.01)
*B64C 3/26*   (2006.01)
(Continued)

(52) U.S. Cl.
CPC ............... *B64C 21/08* (2013.01); *B64C 3/26* (2013.01); *B64C 5/02* (2013.01); *B64C 21/02* (2013.01);
(Continued)

(58) Field of Classification Search
CPC ......... B64C 21/02; B64C 1/0009; B64C 1/26; B64C 3/14; B64C 3/58; B64C 27/06;
(Continued)

(56) References Cited

U.S. PATENT DOCUMENTS 2,036,891 A * 4/1936 Sline ...................... B64C 21/02
244/204
2,111,530 A * 3/1938 De Seversky .......... B64C 21/06
244/209

(Continued)

FOREIGN PATENT DOCUMENTS

DE          4436748 C1    9/1995
DE   10 2010 014 640 A1  10/2011
(Continued)

OTHER PUBLICATIONS

Search Report for DE 10 2017 123 440.3 dated Jun. 12, 2018, 8 pages.

(Continued)

*Primary Examiner* — Medhat Badawi
(74) *Attorney, Agent, or Firm* — Nixon & Vanderhye P.C.

(57) ABSTRACT

A vertical tail unit (7) for flow control including: an outer skin (13) in contact with an ambient air flow (21), wherein the outer skin (13) extends between a leading edge (23) and a trailing edge (25), and surrounds an interior space (29), and wherein the outer skin (13) includes a porous section (31) in the area of the leading edge (23), a pressure chamber (15) arranged in the interior space (29), wherein the pressure chamber (15) is fluidly connected to the porous section (31), an air inlet (17) provided in the outer skin (13), wherein the air inlet (17) is fluidly connected to the pressure chamber (15), wherein the air outlet (19) is fluidly connected to the pressure chamber (15). The vertical tail unit (7) has reduced drag and an increased efficiency because the air inlet (17) is (Continued)

formed as an opening (35) in the outer skin (13) at the leading edge (23).

20 Claims, 2 Drawing Sheets

(51) Int. Cl.
  *B64C 5/02* (2006.01)
  *B64C 21/02* (2006.01)
(52) U.S. Cl.
  CPC ........ B64C 21/025 (2013.01); *B64C 2230/06* (2013.01); *B64C 2230/20* (2013.01); *B64C 2230/22* (2013.01)
(58) Field of Classification Search
  CPC ............ B64C 27/467; B64C 2003/148; B64C 2230/08; B64C 2230/28; B64C 2003/143; B64C 2230/04; B64C 2230/20; B64C 21/06; B64C 3/00; B64D 27/02; Y02T 50/10; Y02T 50/60
  See application file for complete search history.

(56) References Cited

U.S. PATENT DOCUMENTS

| | | | | |
|---|---|---|---|---|
| 2,742,247 | A * | 4/1956 | Lachmann | B64C 21/06 244/119 |
| 2,776,100 | A * | 1/1957 | Breguet | B64C 3/26 29/446 |
| 3,213,527 | A * | 10/1965 | Glaze | B64C 21/025 29/896.6 |
| 3,770,560 | A * | 11/1973 | Elder | B32B 3/30 428/116 |
| 3,820,628 | A * | 6/1974 | Hanson | F02K 1/827 181/220 |
| 4,000,869 | A * | 1/1977 | Wong | B64D 33/02 137/15.1 |
| 4,169,567 | A * | 10/1979 | Tamura | B64C 27/16 244/17.11 |
| 4,263,842 | A * | 4/1981 | Moore | F24F 13/15 415/908 |
| 4,657,482 | A * | 4/1987 | Neal | F01D 5/082 415/176 |
| 5,114,100 | A * | 5/1992 | Rudolph | B64D 15/04 244/130 |
| 5,172,874 | A * | 12/1992 | Maciocia | B64D 17/025 244/145 |
| 5,263,667 | A * | 11/1993 | Horstman | B64C 21/06 244/209 |
| 5,366,177 | A * | 11/1994 | DeCoux | B64C 21/06 244/209 |
| 5,398,410 | A * | 3/1995 | Yasui | B21D 47/00 29/424 |
| 5,590,854 | A * | 1/1997 | Shatz | B64D 15/16 244/209 |
| 5,741,456 | A * | 4/1998 | Ayrton | B23K 26/40 428/113 |
| 5,743,488 | A * | 4/1998 | Rolston | F02C 7/045 244/53 B |
| 5,791,601 | A * | 8/1998 | Dancila | B64C 23/00 416/20 R |
| 5,796,612 | A * | 8/1998 | Palmer | B64D 43/02 701/4 |
| 5,806,796 | A * | 9/1998 | Healey | B29C 70/088 244/121 |
| 5,813,625 | A * | 9/1998 | Hassan | B64C 27/467 244/17.11 |
| 5,899,416 | A * | 5/1999 | Meister | B64C 21/06 244/87 |
| 5,923,003 | A * | 7/1999 | Areas | F02K 1/827 181/292 |
| 5,971,328 | A * | 10/1999 | Kota | B63H 25/382 74/108 |
| 5,987,880 | A * | 11/1999 | Culbertson | F02K 1/70 244/11 OB |
| 6,050,523 | A * | 4/2000 | Kraenzien | B64C 9/00 244/130 |
| 6,092,990 | A * | 7/2000 | Hassan | B64C 27/51 416/42 |
| 6,135,395 | A | 10/2000 | Collett | |
| 6,142,425 | A * | 11/2000 | Armanios | B64C 23/00 239/562 |
| 6,179,086 | B1 * | 1/2001 | Bansemir | G10K 11/172 181/290 |
| 6,199,796 | B1 * | 3/2001 | Reinhard | B64C 3/30 244/35 R |
| 6,216,982 | B1 * | 4/2001 | Pfennig | B64C 21/06 244/209 |
| 6,234,751 | B1 * | 5/2001 | Hassan | B64C 23/04 416/42 |
| 6,612,524 | B2 | 9/2003 | Billman et al. | |
| 6,622,973 | B2 * | 9/2003 | Al-Garni | B64C 23/02 244/206 |
| 6,752,358 | B1 * | 6/2004 | Williams | B64C 1/12 244/208 |
| 7,048,230 | B2 | 5/2006 | Meyer | |
| 7,743,884 | B2 * | 6/2010 | Thomas | G10K 11/172 244/119 |
| 8,042,772 | B2 * | 10/2011 | Lutke | B64C 3/46 244/219 |
| 8,091,837 | B2 | 1/2012 | Frankenberger et al. | |
| 8,245,976 | B2 | 8/2012 | Sakurai | |
| 8,282,037 | B2 * | 10/2012 | Jain | B64D 33/02 244/53 B |
| 8,303,056 | B2 * | 11/2012 | Giorgi | E05D 15/58 160/214 |
| 8,336,804 | B2 * | 12/2012 | Hoetzeldt | B32B 5/024 244/1 N |
| 8,459,597 | B2 | 6/2013 | Cloft et al. | |
| 8,484,894 | B2 | 7/2013 | Sakurai | |
| 8,596,573 | B2 | 12/2013 | Ashok | |
| 8,596,584 | B2 * | 12/2013 | Knacke | B64C 21/02 244/209 |
| 8,695,915 | B1 * | 4/2014 | Jones | B64C 1/40 244/1 N |
| 8,783,624 | B2 | 7/2014 | Koppelman | |
| 8,800,915 | B2 | 8/2014 | Gerber | |
| 8,864,082 | B2 | 10/2014 | Syassen | |
| 8,974,177 | B2 * | 3/2015 | Atassi | B64D 33/02 415/914 |
| 9,132,909 | B1 * | 9/2015 | Khorrami | B64C 21/10 |
| 9,193,443 | B2 * | 11/2015 | Voege | B64C 3/00 |
| 9,272,772 | B2 * | 3/2016 | Reckzeh | B64C 9/24 |
| 9,278,753 | B2 * | 3/2016 | Reckzeh | B64C 23/069 |
| 9,359,799 | B2 * | 6/2016 | McCullough | E05D 3/04 |
| 9,511,848 | B2 | 12/2016 | Gerber | |
| 10,005,545 | B2 | 6/2018 | Alderman et al. | |
| 10,183,740 | B2 * | 1/2019 | Gerber | B64C 5/06 |
| 2003/0132351 | A1 * | 7/2003 | Billman | F42B 10/38 244/199.1 |
| 2003/0141144 | A1 * | 7/2003 | Wilson | F02K 1/827 181/292 |
| 2003/0178250 | A1 * | 9/2003 | Putt | C04B 28/14 181/290 |
| 2005/0045774 | A1 * | 3/2005 | Hocking | B64D 29/00 244/209 |
| 2005/0097929 | A1 * | 5/2005 | Anderson | E05B 75/00 70/16 |
| 2005/0151026 | A1 * | 7/2005 | Meyer | B64D 33/02 244/204 |
| 2006/0272279 | A1 * | 12/2006 | Palumbo | E04C 2/296 52/783.1 |
| 2007/0029450 | A1 * | 2/2007 | Kloker | B64C 21/06 244/204 |
| 2007/0084297 | A1 * | 4/2007 | Powell | B64C 21/025 73/861 |
| 2007/0221788 | A1 * | 9/2007 | Meister | B64C 21/025 244/208 |

(56) References Cited

U.S. PATENT DOCUMENTS

| | | | |
|---|---|---|---|
| 2007/0264152 A1* | 11/2007 | Zhao | B22F 3/1134 |
| | | | 419/2 |
| 2007/0292658 A1* | 12/2007 | Thomas | B32B 3/10 |
| | | | 428/116 |
| 2008/0112796 A1* | 5/2008 | Coney | F02K 1/827 |
| | | | 415/115 |
| 2008/0296439 A1* | 12/2008 | Cloft | F02C 6/08 |
| | | | 244/208 |
| 2009/0210103 A1* | 8/2009 | Cook | B64C 23/005 |
| | | | 701/3 |
| 2009/0212165 A1* | 8/2009 | Parikh | B64C 21/06 |
| | | | 244/209 |
| 2009/0250293 A1* | 10/2009 | Gleine | B32B 5/024 |
| | | | 181/290 |
| 2009/0261204 A1* | 10/2009 | Pitt | B64C 21/08 |
| | | | 244/201 |
| 2009/0266937 A1* | 10/2009 | Frankenberger | F15D 1/12 |
| | | | 244/209 |
| 2010/0181434 A1* | 7/2010 | Powell | B64C 21/08 |
| | | | 244/209 |
| 2010/0181435 A1* | 7/2010 | Sakurai | B64C 21/08 |
| | | | 244/209 |
| 2010/0187360 A1* | 7/2010 | Rawlings | B32B 15/20 |
| | | | 156/278 |
| 2010/0187361 A1* | 7/2010 | Rawlings | B32B 15/08 |
| | | | 428/141 |
| 2010/0216385 A1* | 8/2010 | Heuer | B64D 13/02 |
| | | | 454/71 |
| 2010/0294892 A1* | 11/2010 | Syassen | B64C 21/06 |
| | | | 244/209 |
| 2011/0117338 A1* | 5/2011 | Poquette | C25D 5/54 |
| | | | 427/244 |
| 2011/0212291 A1* | 9/2011 | Buellesbach | B64C 1/18 |
| | | | 428/116 |
| 2011/0262721 A1* | 10/2011 | Albertelli | B29C 70/46 |
| | | | 428/196 |
| 2011/0284689 A1* | 11/2011 | Thomas | G10K 11/168 |
| | | | 244/1 N |
| 2011/0306285 A1* | 12/2011 | Heuer | B64D 13/02 |
| | | | 454/76 |
| 2012/0037760 A1* | 2/2012 | Koppelman | B64C 21/06 |
| | | | 244/209 |
| 2012/0187252 A1* | 7/2012 | Gerber | B64C 21/06 |
| | | | 244/209 |
| 2012/0280088 A1 | 11/2012 | Sakurai | |
| 2013/0025727 A1* | 1/2013 | Gerber | B64C 21/06 |
| | | | 244/209 |
| 2014/0021304 A1* | 1/2014 | Gerber | B64C 21/06 |
| | | | 244/35 R |
| 2014/0224435 A1* | 8/2014 | Stawski | E06B 3/486 |
| | | | 160/192 |
| 2014/0295747 A1* | 10/2014 | Schmid | B64D 13/00 |
| | | | 454/76 |
| 2015/0008684 A1* | 1/2015 | Ching | E05D 11/00 |
| | | | 292/288 |
| 2015/0259060 A1* | 9/2015 | Khorrami | B64C 1/40 |
| | | | 244/1 N |
| 2016/0068250 A1* | 3/2016 | Meyer | B64C 3/14 |
| | | | 244/123.1 |
| 2016/0159465 A1* | 6/2016 | Koppelman | B64C 21/06 |
| | | | 244/209 |
| 2016/0185449 A1* | 6/2016 | Baker | B64C 21/08 |
| | | | 244/75.1 |
| 2017/0197706 A1* | 7/2017 | Garcia | B64C 3/26 |
| 2017/0369147 A1* | 12/2017 | Wong | B64C 1/40 |
| 2018/0134373 A1* | 5/2018 | Reckzeh | B64C 21/08 |
| 2018/0265208 A1* | 9/2018 | Yousef | B64D 33/02 |
| 2019/0106201 A1* | 4/2019 | Heuer | B64C 21/08 |
| 2019/0106202 A1* | 4/2019 | Heuer | B64C 21/08 |
| 2019/0256201 A1* | 8/2019 | Plekhanov | B64C 39/024 |
| 2020/0184834 A1* | 6/2020 | Lohmiller | G08G 5/0056 |
| 2020/0369376 A1* | 11/2020 | Heuer | B64C 21/025 |
| 2021/0214072 A1* | 7/2021 | Heuer | B64C 3/26 |

FOREIGN PATENT DOCUMENTS

| | | |
|---|---|---|
| DE | 10 2010 014 641 A1 | 10/2011 |
| DE | 10 2010 036 154 A1 | 3/2012 |
| DE | 10 2012 006 194 | 10/2013 |
| EP | 2 853 485 | 4/2015 |
| EP | 2 886 453 | 6/2015 |
| EP | 2 891 606 A1 | 7/2015 |
| EP | 3 199 450 | 8/2017 |
| GB | 718421 | 11/1954 |
| GB | 2234351 A | 10/1998 |
| RU | 2 070 144 | 12/1996 |
| WO | 9221560 | 12/1992 |
| WO | 9847761 | 10/1998 |
| WO | 2011/045027 | 4/2011 |
| WO | 2011/128 069 A1 | 10/2011 |

OTHER PUBLICATIONS

Wong et al. "Drag Reduction Using Boundary Layer Suction and Blowing", CEAS/KATnet Conference on Key Aerodynamic Technologies (Jun. 2005).

Schrauf et al., "Simplified Hybrid Laminar Flow Control", European Congress on Computational Methods in Applied Science and Engineering CCOMAS 2004 (Jul. 2004).

Schrauf "Status and Perspective of Laminar Flow" The Aeronautical Journal, vol. 109, pp. 639-644 (Dec. 2005).

Wagner et al., "Laminar Flow Control Leading Edge Systems in Simulated Airline Service," 16th Congress of the International Council of the Aeronautical Sciences (Aug. 1988).

Braslow "A History of Suction-Type Laminar Flow Control with Emphasis on Flight Research", NASA History Division, Monographs in Aerospace History, No. 13 (1999).

Wong et al., "Studies of Methods and Philosophies for Designing Hybrid Laminar Flow Wings," ICAS 2000 Congress, pp. 282.1 to 282.11 (Aug. 2000).

Joslin, "Aircraft Laminar Flow Control", Annular Review of Fluid Mechanics, vol. 30; pp. 1-29 (1998).

Henke, "A 320 HLF Fin: Flight Test Completed", Air & Space Europe, vol. 1, No. 2 (1999).

"Hight Reynolds Number Hybrid Laminar Flow Control (HLFC) Flight Experiment: IV Suction System Design and Manufacture", NASA/CR-1999-209326 (Apr. 1999).

Schmitt et al., "Hybrid Laminar Fin Investigation", Paper RTO AVT Symposium on Active Technology for Enhanced Performance Operational Capabilities of Military Aircraft, Land Vehicles and Sea Vehicles, RTO MP-051 (May 2000).

Search Report for DE 10 2017 115 558.9, dated Mar. 5, 2018, 9 pages.

European Search Report cited in 18197803.2 dated Feb. 18, 2019, 8 pages.

Search Report cited in RU 2018135306/11(058160) completed Oct. 28, 2019, 2 pages.

* cited by examiner

VERTICAL TAIL UNIT FOR FLOW CONTROL

RELATED APPLICATIONS

This application is a continuation of Ser. No. 16/153,993 filed Oct. 8, 2018, which claims priority to German Patent Application No. 10 2017 123 440.3, filed Oct. 9, 2017, both of which applications are incorporated by reference in their entirety.

BACKGROUND

The present invention relates to a vertical tail unit for an aircraft. The vertical tail unit is configured for flow control, such as for hybrid laminar flow control. A further aspect of the present invention relates to an aircraft comprising such a vertical tail unit.

The vertical tail unit comprises an outer skin, a pressure chamber, an air inlet, and an air outlet. The vertical tail unit may further comprise a plurality of structural parts, such as stiffeners, for supporting the outer skin from the inside. Further, the vertical tail unit may be composed of a vertical stabilizer and a rudder pivotally mounted to the vertical stabilizer.

The outer skin is in contact with an ambient air flow and extends between a leading edge facing the incoming flow, and a trailing edge. Further, the outer skin has two opposite lateral sides and surrounds an interior space. The outer skin further comprises a porous section in the area of the leading edge for letting air through the outer skin. The porous section might be formed e.g. as a perforated skin panel or as a skin panel made from a porous material.

The pressure chamber is arranged in the interior space for holding an overpressure or an under pressure with respect to the pressure of the ambient air flow in front of the porous section. The pressure chamber is fluidly connected to the porous section.

The air inlet is provided in the outer skin for letting in air from the ambient air flow. The air inlet is fluidly connected to the pressure chamber and configured to cause, in flight of the associated aircraft, an overpressure in the pressure chamber, such that air from the pressure chamber discharges through the porous section to the ambient air flow.

The air outlet is provided in the outer skin for letting out air into the ambient air flow. The air outlet is fluidly connected to the pressure chamber and configured to cause, in flight of the associated aircraft, an under-pressure in the pressure chamber such that air from the ambient air flow is sucked in through the porous section into the pressure chamber. The air outlet may be formed as a movable flap that is or can be opened in the direction of the trailing edge.

Such vertical tail units are known in the art. The air inlet of the known vertical tail units is often formed as an air scoop that projects out of the outer skin into the ambient air flow. However, such an air scoop causes additional drag at the vertical tail unit and decreases efficiency.

SUMMARY OF THE INVENTION

A vertical tail unit has been invented and is described herein that may provide reduced drag an increased efficiency with respect to prior vertical tail units.

This object is achieved in that the air inlet is formed as an opening in the outer skin at the leading edge. The opening might be formed as a hole in the outer skin with a channel following to the inside of the vertical tail unit. In such a way, no parts of the air inlet project out from the outer skin into the ambient air flow so that no additional drag is caused by the air inlet or at least the additional drag is minimized.

According to a first embodiment, the air inlet is arranged at a stagnation point of the leading edge, i.e. at the point where the ambient air flow impinging on the leading edge separates in opposite directions. In such a way, the relatively high stagnation pressure can be used to pressurize the pressure chamber.

According to another embodiment, the air inlet has a circular shape or an oval shape. Such a shape assists for a minimum drag and a maximum pressure in the pressure chamber. However, the air inlet might also have a rectangular shape which is advantageous due to a simple design.

According to another embodiment, the air inlet is arranged further to a root of the vertical tail unit than the porous section. The root relates to that part of the vertical tail unit where the vertical tail unit is or can be connected to a fuselage. In other words, the air inlet is arranged below the porous section. In such a way, the air inlet and the porous section do not interfere one another.

According to a further embodiment, the air inlet is connected to the pressure chamber via an inlet duct. The inlet duct may proceed from the air inlet upwards to the pressure chamber.

In particular, the air outlet may be connected to the pressure chamber via an outlet duct. At least parts of the inlet duct and the outlet duct may be formed integrally as a single piece component. In such a way, a minimum amount of structure and thus weight is required.

According to another embodiment, the air inlet comprises a door for closing the air inlet. The door may be configured to close the air inlet both partly and fully. In such a way, it can be controlled whether and to which extent the ambient air flow can pass through the outer skin into the vertical tail unit.

In particular, the door may be mounted to a hinge, so that the door is pivotable to the inside of the channel when the door is opened. In such a way, no parts of the air inlet project out of the outer skin into the ambient air flow. Further, reliable sealing of the door is enabled.

Further, the hinge may be mounted to a bottom edge or to a top edge of the air inlet with a horizontal hinge axis. In such a way, a symmetric door is enabled that can reliably be sealed.

Alternatively, the hinge may extend centrally across the air inlet. The door includes two door wings mounted to the hinge such that each door wing may cover a part of the inlet opening. In such a way, the air pressure of the ambient air flow in the closed position of the door is divided between the two wings, so that the door wings and actuators can be designed less strong.

In particular, the hinge may have a vertical or horizontal hinge axis. In such a way a symmetric and simple design of the door wings is enabled.

The invention may be embodied in a vertical tail unit of an aircraft. The features and advantages mentioned above in connection with the vertical tail unit also apply for the aircraft.

SUMMARY OF DRAWINGS

Embodiments of the present invention are described in more detail by means of a drawing. The drawings include.

DETAILED DESCRIPTION

Figure 1:
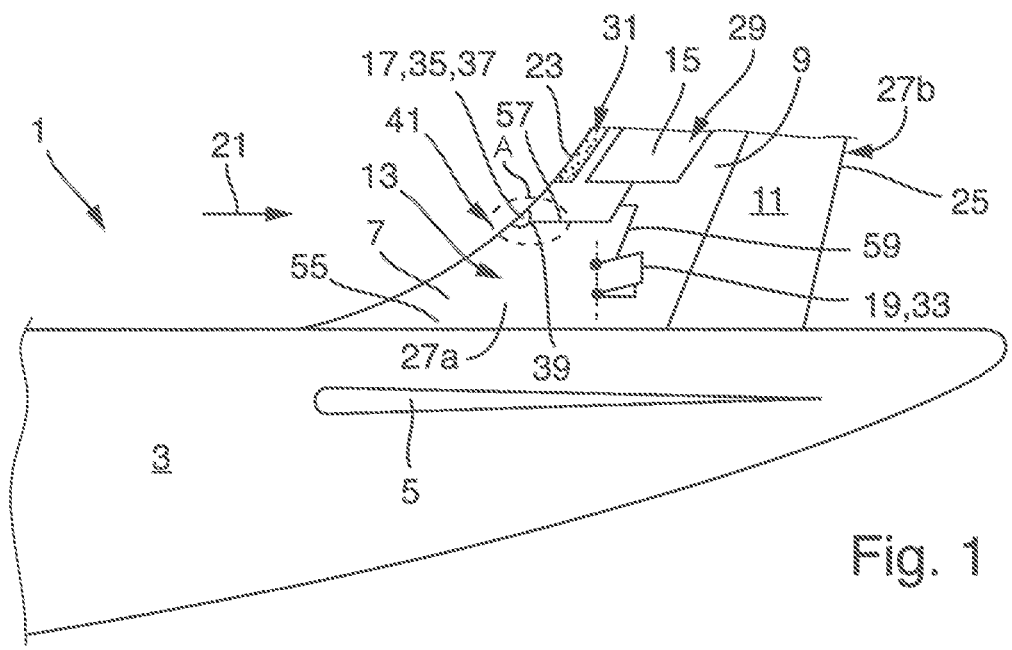
FIG. 1 is a side view of the tail section of an aircraft.

In FIG. 1 an embodiment of an aircraft 1 according to the invention is illustrated. The aircraft 1 comprises a fuselage 3, a horizontal tail unit 5, and a vertical tail unit 7 according to an embodiment of the invention. The vertical tail unit 7 comprises a vertical stabilizer 9 and a rudder 11 pivotally mounted to the vertical stabilizer 9. The vertical tail unit 7 is configured for hybrid laminar flow control and comprises an outer skin 13, a pressure chamber 15, an air inlet 17, and an air outlet 19.

The outer skin 13 is in contact with an ambient air flow 21 and extends between a leading edge 23 and a trailing edge 25. Further, the outer skin 13 has two opposite lateral sides 27a, 27b and surrounds an interior space 29. The outer skin 13 further comprises a porous section 31 in the area of the leading edge 23 for letting air through the outer skin 13.

The pressure chamber 15 is arranged in the interior space 29 for holding an overpressure or an under-pressure with respect to the pressure of the ambient air flow 21 in front of the porous section 31. The pressure chamber 15 is fluidly connected to the porous section 31.

The air outlet 19 is arranged in the outer skin 13 for letting out air into the ambient air flow 21. The air outlet 19 is fluidly connected to the pressure chamber 15 and configured to cause, in flight of the associated aircraft 1, an under-pressure in the pressure chamber 15 such that air from the ambient air flow 21 is sucked in through the porous section 31 into the pressure chamber 15. The air outlet 19 includes a pivotable flap 33 that can be opened in the direction of the trailing edge 25.

The air inlet 17 is arranged in the outer skin 13 for letting air from the ambient air flow 21 into the vertical tail unit 7. The air inlet 17 is fluidly connected to the pressure chamber 15 and configured to cause, in flight of the associated aircraft 1, an overpressure in the pressure chamber 15, such that air from the pressure chamber 15 discharges through the porous section 31 to the ambient air flow 21. The air inlet 17 is formed as an opening 35 in the outer skin 13 at the leading edge 23. The opening 35 might be formed as a hole 37 in the outer skin 13 with a channel 39 following to the inside of the vertical tail unit 7. The air inlet 17 is arranged at a stagnation point 41 of the leading edge 23 and has a circular shape.

Figure 2:
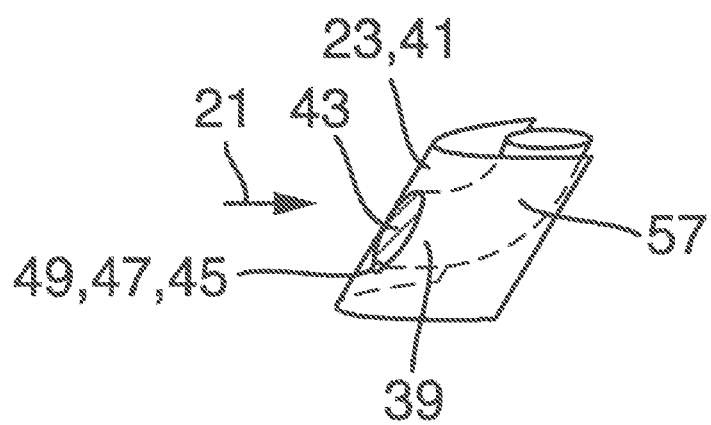
FIG. 2 is a detailed side view of section A in FIG. 1 and shows a first embodiment of an air inlet to be employed in the aircraft shown in FIG. 1 with a bottom hinge and a door in a closed position.
Figure 3:
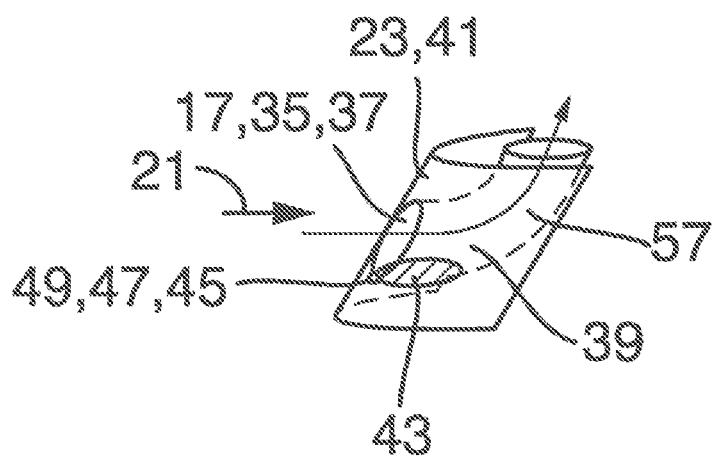
FIG. 3 shows the air inlet shown in FIG. 2 with the door in an opened position.

As shown in FIGS. 2 to 6, the air inlet 17 comprises a door 43 for closing the air inlet 17. The door 43 is mounted to a hinge 45 such that the door 43 is pivotable to the inside of the channel 39 when the door 43 is opened. In the embodiment shown in FIGS. 2 and 3, the hinge 45 is mounted to a bottom edge 47 of the air inlet 17 with a horizontal hinge axis 49, wherein FIG. 2 shows the door 43 in a closed position and FIG. 3 shows the door 43 in an opened position.

Figure 4:
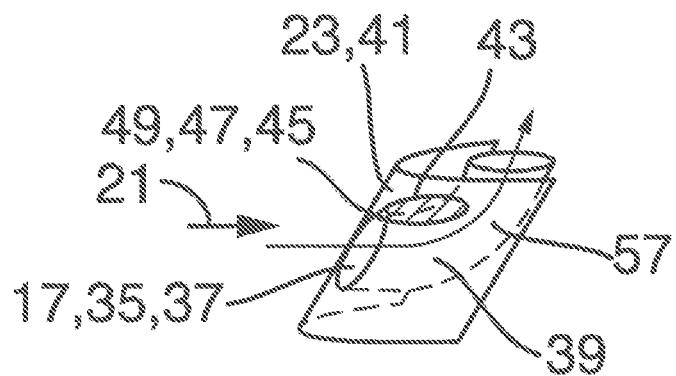
FIG. 4 shows a detailed side view of section A in FIG. 1 and shows a second embodiment of an air inlet to be employed in the aircraft shown in FIG. 1 with a top hinge and the door in an opened position.

In the embodiment shown in FIG. 4, the hinge 45 is mounted to a top edge 51 of the air inlet 17 with a horizontal hinge axis 49.

Figure 5:
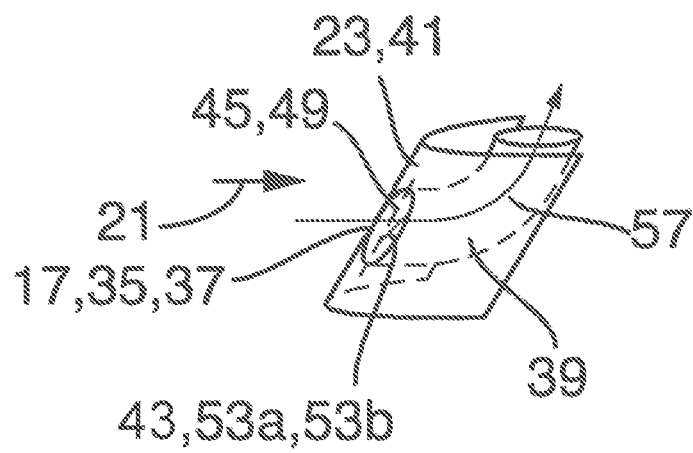
FIG. 5 shows a detailed side view of section A in FIG. 1 and shows a third embodiment of an air inlet to be employed in the aircraft shown in FIG. 1 with a central hinge and two door wings in an opened position.
Figure 6:
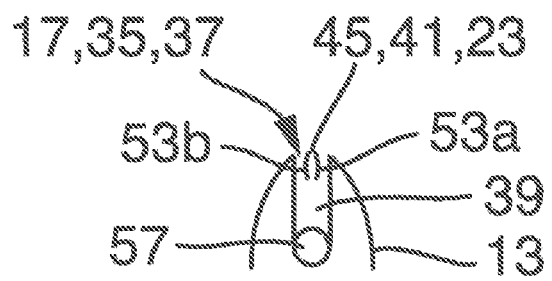
FIG. 6 is a top view of the air inlet shown in FIG. 5.

In the embodiment shown in FIGS. 5 and 6, the hinge 45 extends centrally across the air inlet 17. The door 43 includes two door wings 53a, 53b mounted to the hinge 45 such that each door wing 53a, 53b may cover a part of the inlet opening 35. The hinge 45 has a vertical hinge axis 49.

As shown in FIG. 1, the air inlet 17 is arranged further to a root 55 of the vertical tail unit 7 than the porous section 31. The air inlet 17 is connected to the pressure chamber 15 via an inlet duct 57 that proceeds from the air inlet 17 upwards to the pressure chamber 15. The air outlet 19 is connected to the pressure chamber 15 via an outlet duct 59. Wide parts of the inlet duct 57 and the outlet duct 59 are formed integrally.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A vertical tail unit for flow control, comprising
an outer skin configured to contact an ambient air flow, wherein the outer skin extends between a leading edge and a trailing edge, and the outer skin surrounds an interior space, and wherein the outer skin comprises a porous section in an area of the leading edge,
a pressure chamber arranged in the interior space, wherein the pressure chamber is fluidly connected to the porous section,
an air inlet provided in the outer skin, wherein the air inlet is fluidly connected to the pressure chamber and configured to cause an overpressure in the pressure chamber such that air discharges through the porous section into the ambient air flow, wherein the air inlet is formed as an opening in the outer skin at the leading edge,
an air outlet duct including an air outlet provided in the outer skin, wherein the air outlet is fluidly connected via the air outlet duct to the pressure chamber and configured to cause an under-pressure in the pressure chamber such that air of the ambient air flow is sucked in through the porous section, and
an inlet door configured to close the air inlet, wherein the inlet door is mounted to a hinge within the leading edge so that the door opens by pivoting inward relative to the leading edge to create the overpressure in the pressure chamber, wherein the air inlet is aligned with a stagnation point on a leading edge of the vertical tail unit, and
an outlet door configured to close the air outlet duct, wherein the outlet door opens to create the under-pressure in the pressure chamber which causes the ambient air to flow through the porous section and into the pressure chamber.

2. The vertical tail unit according to claim 1, wherein the air inlet is on the leading edge at a location separate from the porous section.

3. The vertical tail unit according to claim 1, wherein the air inlet has a circular shape or an oval shape.

4. The vertical tail unit according to claim 1, wherein the air inlet is closer to a root of the vertical tail unit than to the porous section.

5. The vertical tail unit according to claim 1, wherein the air inlet is connected to the pressure chamber via an inlet duct.

6. The vertical tail unit according to claim 5, wherein the air outlet duct extends from the air outlet to the pressure chamber.

7. The vertical tail unit according to claim 6, wherein parts of both the inlet duct and the outlet duct are a single piece component.

8. The vertical tail unit according to claim 1, wherein the air inlet comprises a door for closing the air inlet.

9. The vertical tail unit according to claim 8, wherein the door is mounted to a hinge so that the door is pivotable to the inside when the door is opened.

10. The vertical tail unit according to claim 9, wherein the hinge is mounted to a bottom edge or to a top edge of the air inlet and the hinge has a horizontal hinge axis.

11. The vertical tail unit according to claim 9, wherein the hinge extends across the air inlet, and the door includes two door wings each mounted to the hinge such that each of the two door wings pivots about the hinge and the two door wings cover the inlet opening while the door is closed.

12. The vertical tail unit according to claim 11, wherein the hinge has a vertical hinge axis.

13. An aircraft comprising a vertical tail unit according to claim 1.

14. A vertical tail unit for an aircraft comprising
an outer skin configured to contact ambient air flowing over the aircraft during flight, wherein the outer skin forms a leading edge and includes opposite lateral sides extending from the leading edge towards a trailing edge of the vertical tail unit, wherein the outer skin comprises a porous section of the leading edge;
an interior volume within the outer skin;
a pressure chamber in the interior space fluidly connected to the porous section,
an air inlet in the outer skin at the leading edge, wherein the air inlet is fluidly connected to the pressure chamber and configured to cause an overpressure in the pressure chamber such that air discharges from the pressure chamber, through the porous section and into ambient air flowing over the porous section, wherein the air inlet is at the leading edge of the vertical tail unit and aligned with a stagnation point on the leading edge;
an inlet door configured to close the air inlet, wherein the inlet door is mounted to a hinge proximate the leading edge and the inlet door is pivotable about the hinge to cause a trailing edge of the inlet door to move inside the leading edge to create the overpressure in the pressure chamber;
an air outlet duct fluidly connected to the pressure chamber and configured to cause an under pressure in the pressure chamber such that ambient air flowing over the porous section is sucked in through the porous section and into the pressure chamber, and
an outlet door configured to close the air outlet duct, wherein the outlet door opens to create the underpressure in the pressure chamber which causes the ambient air to flow through the porous section and into the pressure chamber.

15. The vertical tail unit according to claim 14, wherein the air inlet is on the leading edge at a location separate from the porous section.

16. The vertical tail unit according to claim 14, wherein the air inlet is closer to a root of the vertical tail unit than the porous section.

17. The vertical tail unit according to claim 14, wherein the air inlet is on a portion of the leading edge oriented at an angle from vertical which is greater than an angle from vertical of the porous section.

18. The vertical tail unit according to claim 14, wherein the inlet door is mounted to the vertical tail along a horizontal hinge axis.

19. The vertical tail unit according to claim 14, wherein the hinge extends across the air inlet, and the inlet door includes two door wings each mounted to the hinge, wherein the two door wings pivot about the hinge to close and open the inlet opening.

20. The vertical tail unit according to claim 17, wherein the inlet door is attached to the vertical tail unit by a hinge having a vertical hinge axis.

* * * * *